United States Patent
Bancroft et al.

(10) Patent No.: US 9,435,469 B2
(45) Date of Patent: Sep. 6, 2016

(54) COUPLING WITH NOTCHED PROJECTIONS HAVING GASKET POCKET OF VARYING DEPTH

(71) Applicant: Victaulic Company, Easton, PA (US)

(72) Inventors: Philip W. Bancroft, Belvidere, NJ (US); Frank J. Cygler, III, Nazareth, PA (US); Douglas R. Dole, Whitehouse Station, NJ (US)

(73) Assignee: Victaulic Company, Easton, PA (US)

( * ) Notice: Subject to any disclaimer, the term of this patent is extended or adjusted under 35 U.S.C. 154(b) by 486 days.

(21) Appl. No.: 13/794,930

(22) Filed: Mar. 12, 2013

(65) Prior Publication Data

US 2014/0070529 A1  Mar. 13, 2014

Related U.S. Application Data

(60) Provisional application No. 61/699,628, filed on Sep. 11, 2012.

(51) Int. Cl.
F16L 17/04 (2006.01)
F16L 21/00 (2006.01)

(52) U.S. Cl.
CPC .............. F16L 17/04 (2013.01); F16L 21/005 (2013.01)

(58) Field of Classification Search
CPC ............................... F16L 17/04; F16L 21/005
See application file for complete search history.

(56) References Cited

U.S. PATENT DOCUMENTS

| | | |
|---|---|---|
| 1,020,123 A | 3/1912 | Brampton et al. |
| 1,203,989 A | 7/1916 | Dehn |
| 1,287,108 A | 12/1918 | Robinson et al. |
| 1,379,811 A | 5/1921 | Fyffe |
| 1,770,271 A | 7/1930 | Hoppes |
| 1,969,043 A | 8/1934 | Sharp |
| 1,999,045 A | 4/1935 | Goetz |
| 2,094,258 A | 9/1937 | Thompson |
| 2,128,720 A | 8/1938 | Tweedale |
| 2,412,394 A | 12/1946 | Giles |

(Continued)

FOREIGN PATENT DOCUMENTS

| | | |
|---|---|---|
| CN | 1221089 A | 6/1999 |
| CN | 101886721 A | 11/2010 |

(Continued)

OTHER PUBLICATIONS

Chionchio, John A.; Fitting for Joining Pipe Elements; Utility U.S. Appl. No. 13/346,412, filed Feb. 2, 2012; Specification, Claims and Drawings; pp. 1-54.

(Continued)

*Primary Examiner* — James Hewitt
*Assistant Examiner* — Jay R Ripley
(74) *Attorney, Agent, or Firm* — Ballard Spahr LLP

(57) ABSTRACT

A mechanical coupling for joining pipe elements has segments joined end to end, each segment having a pocket of varying depth for receiving a ring gasket. The varying depth of the pocket is used to control the distortion of the ring gasket between a round shape and a non-round shape when the segments are arranged in spaced apart relation around the ring gasket, the spacing between the segments being sufficient to permit insertion of the pipe elements without disassembly of the coupling. Notches in the projections which engage the pipe elements facilitate insertion of pipe elements and provide for a compact coupling design.

42 Claims, 8 Drawing Sheets

(56) References Cited

U.S. PATENT DOCUMENTS

| | | | |
|---|---|---|---|
| 2,463,235 A | | 3/1949 | Andrews |
| 2,958,546 A | | 11/1960 | Lee |
| 3,142,502 A | * | 7/1964 | Luther .................. F16L 33/23 285/242 |
| 3,153,550 A | | 10/1964 | Hollett |
| 3,466,069 A | | 9/1969 | Hoke et al. |
| 3,517,701 A | | 6/1970 | Smith |
| 3,596,935 A | | 8/1971 | McGoech, Sr. |
| 3,680,894 A | | 8/1972 | Young |
| 3,768,819 A | * | 10/1973 | Burkert .................. F16J 15/025 277/647 |
| 3,825,286 A | | 7/1974 | Henry, III |
| 3,920,270 A | | 11/1975 | Babb, Jr. |
| 3,944,260 A | | 3/1976 | Petroczky |
| 4,018,979 A | | 4/1977 | Young |
| 4,284,298 A | | 8/1981 | Kaufmann, Jr. |
| 4,461,498 A | | 7/1984 | Kunsman |
| 4,471,979 A | | 9/1984 | Gibb et al. |
| 4,611,839 A | | 9/1986 | Rung et al. |
| 4,633,913 A | | 1/1987 | Carty et al. |
| 4,639,020 A | | 1/1987 | Rung et al. |
| 4,652,023 A | | 3/1987 | Timmons |
| 4,678,208 A | | 7/1987 | De Raymond |
| 4,893,843 A | * | 1/1990 | DeRaymond ........... F16L 21/02 277/616 |
| 4,896,902 A | | 1/1990 | Weston |
| 5,022,685 A | | 6/1991 | Stiskin et al. |
| 5,121,946 A | | 6/1992 | Jardine |
| 5,161,836 A | | 11/1992 | McKinnon |
| 5,230,537 A | | 7/1993 | Newman |
| 5,452,922 A | | 9/1995 | Ziu |
| 5,675,873 A | | 10/1997 | Groess |
| 5,758,907 A | | 6/1998 | Dole et al. |
| 5,786,054 A | | 7/1998 | Platusich et al. |
| 6,076,861 A | | 6/2000 | Ikeda |
| 6,276,726 B1 | | 8/2001 | Daspit |
| 6,305,719 B1 | | 10/2001 | Smith, Jr. et al. |
| 6,450,551 B1 | | 9/2002 | Lee |
| 6,626,466 B1 | | 9/2003 | Dole |
| 7,070,209 B2 | | 7/2006 | Collins |
| 7,090,259 B2 | | 8/2006 | Dole |
| 7,644,960 B2 | | 1/2010 | Casey, Sr. et al. |
| 7,712,796 B2 | | 5/2010 | Gibb et al. |
| 7,726,703 B2 | | 6/2010 | Porter et al. |
| 7,789,434 B2 | | 9/2010 | Nagle et al. |
| 7,861,982 B1 | | 1/2011 | McClure |
| 7,891,713 B2 | | 2/2011 | Bekkevold |
| 7,921,536 B2 | | 4/2011 | Dole |
| 2005/0028366 A1 | | 2/2005 | Bien et al. |
| 2008/0129048 A1 | | 6/2008 | Nagle et al. |
| 2008/0272595 A1 | | 11/2008 | Gibb et al. |
| 2009/0160183 A1 | | 6/2009 | Felber |
| 2009/0206598 A1 | * | 8/2009 | Gibb .................. F16L 17/04 285/364 |
| 2010/0289257 A1 | | 11/2010 | Madara et al. |
| 2010/0320756 A1 | | 12/2010 | Gibb et al. |
| 2011/0154646 A1 | | 6/2011 | Hagiya |
| 2012/0074689 A1 | | 3/2012 | Petersen et al. |
| 2013/0127160 A1 | | 5/2013 | Bancroft et al. |

FOREIGN PATENT DOCUMENTS

| | | |
|---|---|---|
| CN | 104204640 A | 12/2014 |
| DE | 3443942 | 6/1985 |
| DE | 3443943 | 6/1985 |
| GB | 2098297 | 11/1982 |
| KR | 100315861 | 11/2001 |
| KR | 1020090007813 | 1/2009 |
| KR | 100904419 | 6/2009 |
| KR | 1020090066767 | 6/2009 |
| WO | 9703811 | 2/1997 |
| WO | 2013077966 A1 | 5/2013 |

OTHER PUBLICATIONS

Chionchio, John A.; Coupling Having Gasket Pocket of Varying Depth; Utility U.S. Appl. No. 13/300,861, filed Nov. 21, 2011; Specification, Claims and Drawings (Replacement Pages); pp. 1-45.

Chionchio, John A.; Fitting Having Receptacle of Varying Depth; Utility U.S. Appl. No. 13/368,589, filed Feb. 8, 2012; Specification, Claims and Drawings; pp. 1-73.

Copenheaver, Blaine R.; PCT International Search Report and Written opinion regarding International Application No. PCT/US2012/062148; dated Mar. 19, 2013.

Thomas, Shane; International Search Report from corresponding International Patent Application No. PCT/US2013/052918; Feb. 10, 2014, pp. 1-4, United States Patent and Trademark Office as Receiving Office, Alexandria, Virginia, USA.

Thomas, Shane; Written Opinion from corresponding International Patent Application No. PCT/US2013/052918; Feb. 10, 2014, pp. 1-11, United States Patent and Trademark Office as Receiving Office, Alexandria, Virginia, USA.

Wang, Qi; First Office Action from counter-part Chinese patent application No. 201380046976.6; Dec. 31, 2015; pp. 1-8; State Intellectual Property Office of the People's Republic of China.

Author Unknown; English translation of First Office Action from counter-part Chinese patent application No. 201380046976.6; Dec. 31, pp. 1-12; prepared by China Patent Agent (H.K.) Ltd, Wanchai, Hong Kong, 2015.

Wang, Qi; Search Report from counter-part Chinese patent application No. 201380046976.6; Dec. 22, 2015; pp. 1-2; State Intellectual Property Office of the People's Republic of China, Beijing, China.

Author Unknown; English translation of Search Report from counter-part Chinese patent application No. 201380046976.6; Dec. 22, 2015; pp. 1-2; prepared by China Patent Agent (H.K.) LTD, Wanchai, Hong Kong.

Chang, Hung; English translation of Taiwan Office Action from counter part Taiwan patent application No. 101143312; Oct. 22, 2015, pp. 1-3; Intellectual Property Office, Taiwan.

Gutierrez, Royo, M.; European Search Opinion from counter-part European patent application No. 13836639.8; Jan. 25, 2016; pp. 1-4; European Patent Office, Munich, Germany.

Gutierrez, Royo, M.; Supplementary European Search Report and Annex from counter-part European patent application No. 13836639.8; Jan. 25, 2016; pp. 1-2, European Patent Office, Munich, Germany.

* cited by examiner

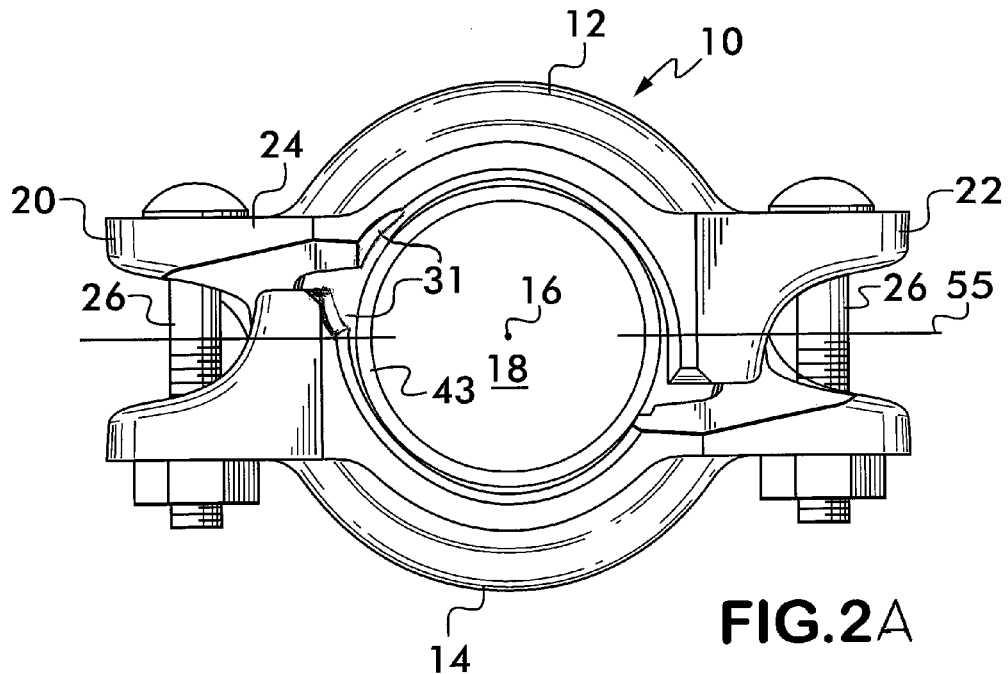
FIG.2A
FIG.3A
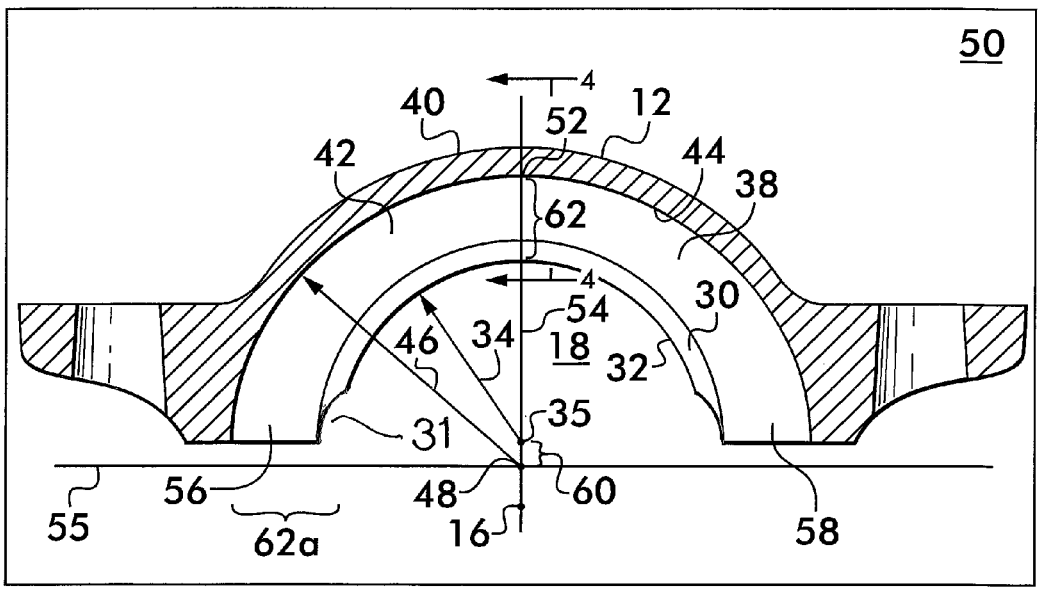

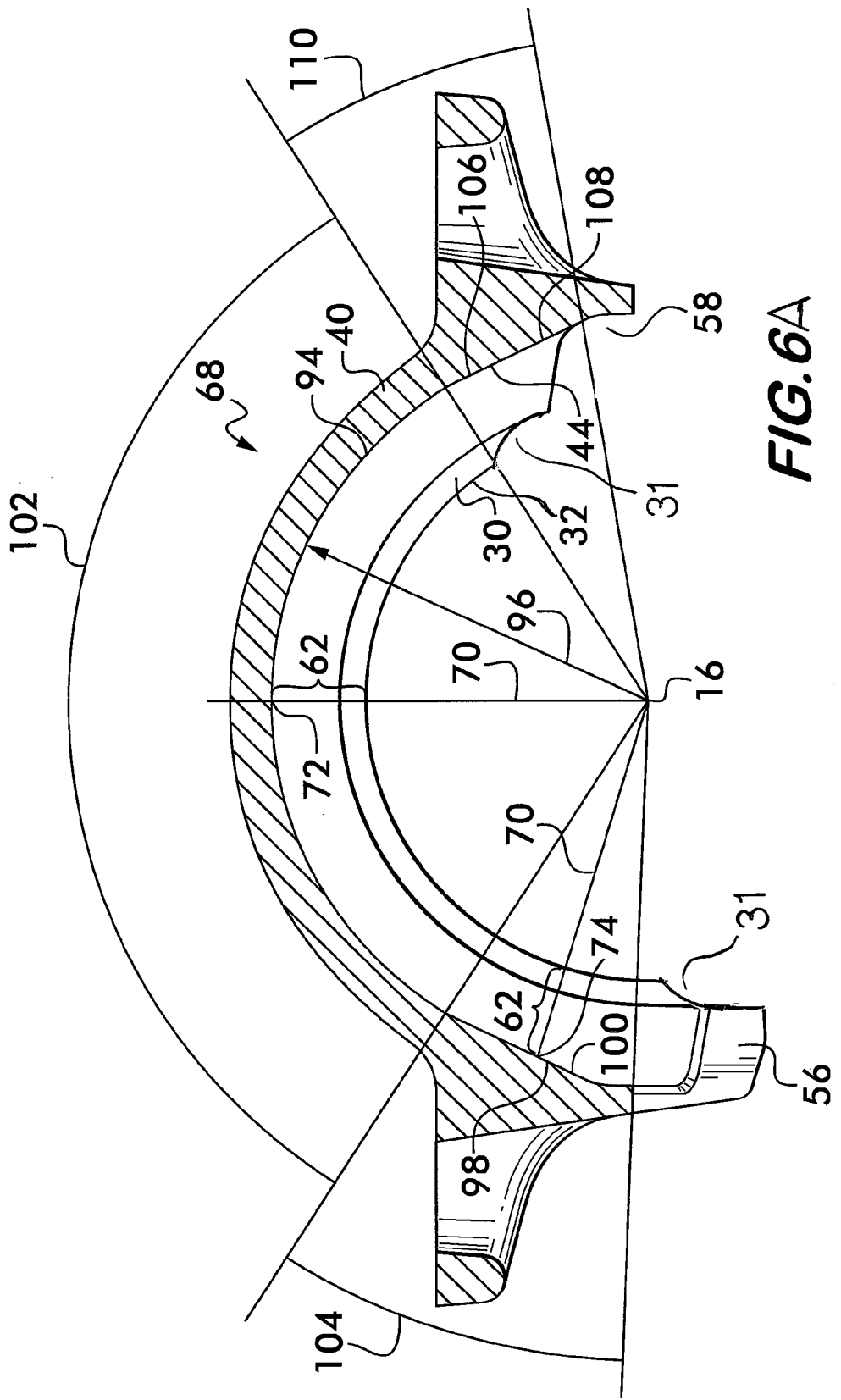

COUPLING WITH NOTCHED PROJECTIONS HAVING GASKET POCKET OF VARYING DEPTH

CROSS REFERENCE TO RELATED APPLICATION

This application is based upon and claims priority to U.S. Provisional Application No. 61/699,628, filed Sep. 11, 2012 and hereby incorporated by reference herein.

FIELD OF THE INVENTION

This invention concerns mechanical couplings for joining pipe elements in end to end relation.

BACKGROUND

Mechanical couplings for joining pipe elements together end-to-end comprise interconnectable segments that are positionable circumferentially surrounding the end portions of co-axially aligned pipe elements. The term "pipe element" is used herein to describe any pipe-like item or component having a pipe-like form. Pipe elements include pipe stock, pipe fittings such as elbows, caps and tees as well as fluid control components such as valves, reducers, strainers, restrictors, pressure regulators and the like.

Each mechanical coupling segment comprises a housing having projections which extend radially inwardly from the housing and engage, for example, the outer surfaces of plain end pipe elements, pipe elements having a shoulder and bead, or circumferential grooves that extend around each of the pipe elements to be joined. Engagement between the projections and the pipe elements provides mechanical restraint to the joint and ensures that the pipe elements remain coupled even under high internal pressure and external forces. The housings define an annular channel or pocket that receives a ring gasket or seal, typically an elastomeric ring which engages the ends of each pipe element and cooperates with the segments and the pipe elements to provide a fluid tight seal. The segments have connection members, typically in the form of lugs which project outwardly from the housings. The lugs are adapted to receive fasteners, such as nuts and bolts, which are adjustably tightenable to draw the segments toward one another.

The projections on prior art couplings typically have arcuate surfaces with a radius of curvature that is substantially matched to the radius of curvature of the outer surface of the pipe element that it is intended to engage. For couplings used with grooved pipe elements, the radii of curvature of the arcuate surfaces are smaller than the radii of curvature of the outer surfaces of the pipe elements outside of the grooves so that the projections fit within and engage the grooves.

Methods of securing pipe elements in end to end relation comprise a sequential installation process when mechanical couplings according to the prior art are used. Typically, the coupling is received by the technician with the segments bolted together and the ring gasket captured within the segments' channels. The technician first disassembles the coupling by unbolting it, removes the ring gasket, lubricates it (if not pre-lubricated) and places it around the ends of the pipe elements to be joined. Installation of the ring gasket often requires that it be lubricated and stretched to accommodate the pipe elements. With the ring gasket in place on both pipe elements, the segments are then placed one at a time straddling the ends of the pipe elements and capturing the ring gasket against them. During placement, the segments engage the gasket, the projections are aligned with the grooves, the bolts are inserted through the lugs, the nuts are threaded onto the bolts and tightened, drawing the coupling segments toward one another, compressing the gasket and engaging the projections within the grooves.

As evident from the previous description, installation of mechanical pipe couplings according to the prior art requires that the technician typically handle at least seven individual piece parts (and more when the coupling has more than two segments), and must totally disassemble and reassemble the coupling. Significant time, effort and expense would be saved if the technician could install a mechanical pipe coupling without first totally disassembling it and then reassembling it, piece by piece.

FIG. 1 shows a coupling 11 having coupling segments 13 and 15. The segments are joined end to end by connection members 17 and 19, the connection members including threaded fasteners 21. The segments 13 and 15 are shown supported in spaced relation from one another on the outer surface of the ring gasket 23 captured between the segments. This configuration is possible because the circumference of the outer surface of an undeformed ring gasket 23 is greater than the sum of the circumferences of the surfaces on the segments with which the ring gasket outer surface interfaces. When the segments are supported in this manner it is possible to insert pipe elements into the central space 25 between the segments without disassembling the coupling. However, there are some drawbacks to this solution to the problem of installing mechanical couplings. Note in particular that the ring gasket 23 is distorted into an oval shape by the geometry of a close-fitting segment riding on at least a portion of the ring gasket before the gasket has properly seated in the gasket pocket of the segment. If the degree of distortion of the ring gasket is uncontrolled, the oval shape can result in pinching and damage to the gasket in the region between the connection members 17 and 19 of the segments 13 and 15.

There is clearly a need for a pipe coupling with which the distortion of the ring seal may be controlled so as to avoid damage to the ring seal with which it is used, yet will also allow pipe elements to be inserted reliably without disassembly of the coupling.

SUMMARY

The invention concerns a coupling for joining pipe elements in end to end relation. In one example embodiment, the coupling comprises a plurality of segments joined end to end surrounding a central axis and defining a central space for receiving the pipe elements. At least one of the segments comprises a pair of projections positioned in spaced apart relation on opposite sides of the one segment and extending toward the central axis. At least a portion of each of the projections is engageable with a respective one of the pipe elements. Each of the projections has first and second notches therein respectively positioned at opposite ends of the projections. Each of the projections has an arcuate surface facing the central axis. The arcuate surface has a first radius of curvature measured from a first center of curvature. A back wall extends between the projections. The back wall has an arcuate surface facing the central axis. The arcuate surface of the back wall has a second radius of curvature measured from a second center of curvature. The second center of curvature is non-coincident with the first center of curvature as measured in a plane perpendicular to the central axis.

In one embodiment, the first center of curvature is closer to the arcuate surface of the back wall than the second center of curvature when measured to a point on the arcuate surface of the back wall that is collinear with the first and second centers of curvature. In another embodiment, the first and second centers of curvature and the point on the back wall are collinear along a first line oriented perpendicular to a second line extending between a first end of the one segment and a second end of the one segment.

The second center of curvature may be offset from the first center of curvature at a distance from about 0.01 inches to about 0.1 inches, or at a distance of about 0.02 inches to about 0.04 inches, or at a distance of about 0.03 inches.

In a particular example embodiment of the coupling according to the invention only a first and a second of the segments are joined end to end surrounding the central axis. In this example, the coupling further comprises a ring gasket positioned between the first and second segments. The ring gasket supports the first and second segments in spaced apart relation sufficient to insert the pipe elements between the segments and may have a shape which is distorted into an oval, or which is substantially undistorted and presents a round shape. The degree of distortion of the ring gasket is determined by the offset of the first and second centers of curvature.

Another example embodiment of a coupling for joining pipe elements in end to end relation according to the invention comprises a plurality of segments joined end to end surrounding a central axis and defining a central space for receiving the pipe elements. In this example embodiment, at least one of the segments comprises a pair of projections positioned in spaced apart relation on opposite sides of the one segment. The projections extend toward the central axis. At least a portion of each of the projections is engageable with a respective one of the pipe elements. At least one of the projections has an arcuate surface facing the central axis. The at least one projection has at least one notch therein positioned at an end of the projection. A back wall extends between the projections. The back wall has an arcuate surface facing the central axis. The distance between the arcuate surface of the back wall and the arcuate surface of the at least one projection, as measured along a radially projecting line extending from the central axis, is a first value at a first point midway between the ends of the at least one segment, and a second value at a second point proximate to at least one of the ends of the at least one segment. The first value is less than the second value. A ring gasket is positioned within the central space defined by the segments. The ring gasket has an outer circumference having a length greater than the sum of the lengths of the arcuate surfaces of the back walls of the segments. The ring gasket supports at least two of said segments in spaced apart relation.

The distance between the arcuate surface of the back wall and the arcuate surface of the at least one projection may be a minimum at the first point midway between the ends of the at least one segment, and a maximum at the second point. The second point may be positioned at the at least one end of the at least one segment. The distance between the arcuate surface of the back wall and the arcuate surface of the at least one projection at a third point positioned at another of the ends of the at least one segment may be a third value approximately equal to the second value.

In a particular example embodiment, the arcuate surface of the back wall comprises a first portion having a curved surface, and a second portion having a curved surface. The second portion is positioned proximate to the at least one end of the at least one segment. Any point on the second portion is farther from said central axis than any point on said first portion. The arcuate surface of the back wall may further comprise a third portion having a curved surface. The third portion is positioned proximate to another of the ends of the at least one segment. Any point on the third portion is farther from said central axis that any point on said first portion.

The second portion of the arcuate surface of the back wall may subtend an angle from about 5° to about 80°, or from about 5° to about 45°. The third portion of the arcuate surface of the back wall may subtend an angle from about 5° to about 80°, or from about 5° to about 45°.

In another example embodiment of a coupling according to the invention, the arcuate surface of the back wall comprises a first portion having a first radius of curvature, and a second portion having an infinite radius of curvature. The second portion is positioned proximate to the at least one end of the at least one segment. Any point on the second portion is farther from the central axis than any point on the first portion. The arcuate surface of the back wall may further comprise a third portion having an infinite radius of curvature. Any point on the third portion is farther from the central axis than any point on the first portion. The third portion is positioned proximate to another of the ends of the at least one segment. The second portion of the arcuate surface of the back wall may subtend an angle from about 5° to about 45°, or from about 5° to about 30°. The third portion of the arcuate surface of the back wall may subtend an angle from about 5° to about 45°, or from about 5° to about 30°. In another example embodiment, the arcuate surface of the back wall may further comprise a plurality of the second portions of the arcuate surface of the back wall, each of the second portions having infinite radii of curvature. Additionally, the arcuate surface of the back wall may further comprise a plurality of the third portions of the arcuate surface of the back wall, each having an infinite radius of curvature. The third portions of the arcuate surfaces of the back wall are positioned proximate to another of the ends of the at least one segment. The plurality of second portions of the arcuate surface of the back wall may subtend an angle from about 5° to about 80°, or from about 5° to about 30°. The plurality of third portions of the arcuate surface of the back wall may subtend an angle from about 5° to about 80°, or from about 5° to about 30°.

In one example embodiment, a coupling according to the invention may comprise only a first and a second of the segments joined end to end surrounding the central axis. The coupling may further comprise a ring gasket positioned between the first and second segments. The ring gasket supports the first and second segments in spaced apart relation sufficient to insert the pipe elements between the segments. The ring gasket may have an oval shape or the ring gasket may have a round shape.

BRIEF DESCRIPTION OF THE DRAWINGS

FIG. 2A is an elevational view of an example mechanical pipe coupling according to the invention;

FIG. 3A is a cross sectional view of a segment of an example mechanical pipe coupling according to the invention;

FIGS. 6 and 6A are cross sectional views of segments of example mechanical pipe couplings according to the invention.

DETAILED DESCRIPTION

Figure 2:
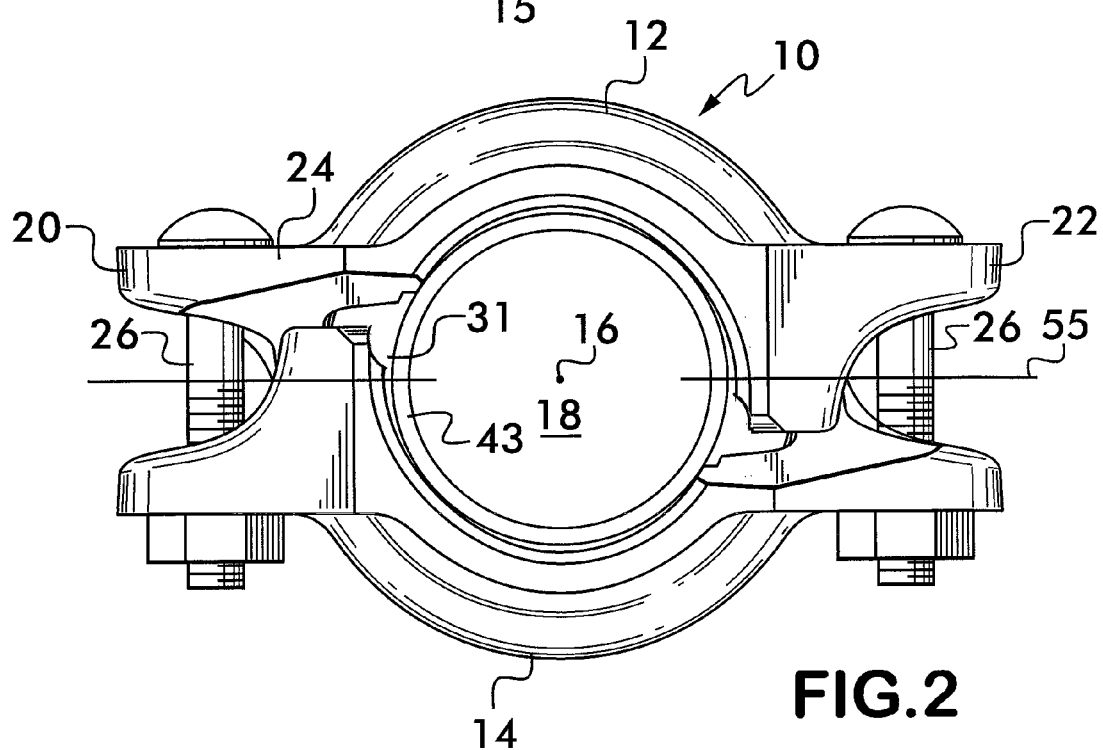
FIG. 2 is an elevational view of an example mechanical pipe coupling according to the invention.

FIG. 2 shows an example embodiment of a coupling 10 according to the invention. Coupling 10 comprises segments 12 and 14 that are joined to one another end to end surrounding a central axis 16 and defining a central space 18. Central space 18 receives the pipe elements to be joined in end to end relation, the longitudinal axis of the pipe elements substantially aligning with the central axis 16. Each of the segments 12 and 14 have connection members 20 and 22 at each end. In this example, the connection members comprise a lug 24 which projects from the segment and receives a threaded fastener 26. Fasteners 26 are adjustably tightenable so as to draw the segments 12 and 14 toward one another and the central axis 16 to engage the pipe elements and form the joint. Segments 12 and 14 are pre-assembled at the factory in spaced relation sufficient to permit insertion of the pipe elements into the central space 18 without disassembling the coupling.

Figure 3:
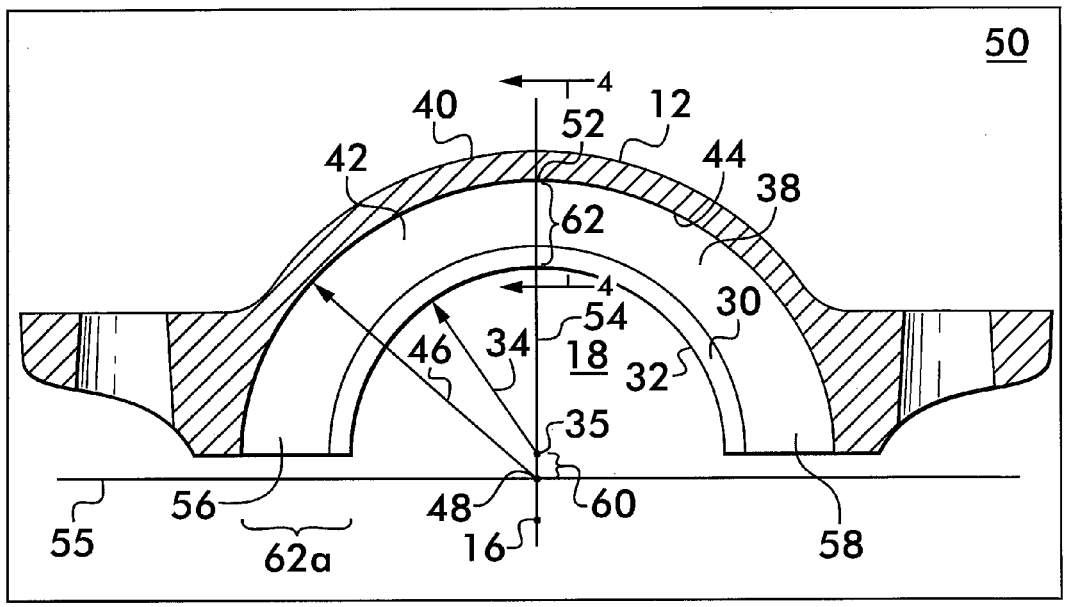
FIG. 3 is a cross sectional view of a segment of an example mechanical pipe coupling according to the invention.
Figure 4:
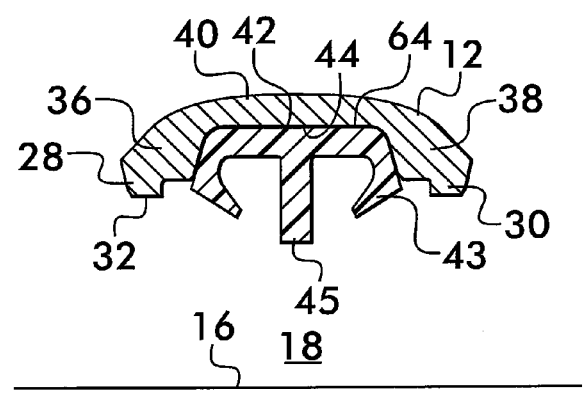
FIG. 4 is a cross sectional view of the segment of an example mechanical pipe coupling taken at line 4-4 of FIG. 3.

As shown in cross section in FIG. 4, each segment (segment 12 being shown) has a pair of projections 28 and 30 positioned in spaced apart relation on opposite sides of the segment. The projections extend toward the central axis 16, and at least a portion of each projection is engageable with a respective pipe element to provide mechanical engagement and hold the pipe elements in end to end relation. The projections 28 and 30 engage the outer surface of the pipe elements, which may be a plain surface, a surface forming a circumferential groove, or a surface having a raised shoulder, or a shoulder and bead for example. The projections have one or more notches 31 (see FIGS. 2, 2A, 3A, 5A and 6A) positioned respectively at opposite ends of the projections (adjacent to the connection members 20 and 22) to facilitate insertion of the pipe elements into the central space 18 as described in detail below. As shown in FIGS. 3 and 4, each projection has an arcuate surface 32 facing central axis 16. The arcuate surface 32 of each projection has a radius of curvature 34 measured from a center of curvature 35 of the arcuate surface.

The segments 12 and 14 also have sidewalls 36 and 38 from which the projections 28 and 30 extend. The sidewalls 36 and 38 are attached to a back wall 40, and together the sidewalls and back wall define a pocket 42. Pocket 42 receives a ring gasket 43 (FIG. 4) positioned between the segments 12 and 14 (see FIG. 2) to ensure a fluid-tight seal. In this example coupling it is the ring gasket which supports the segments 12 and 14 in spaced apart relation when assembled. Back wall 40 extends between projections 28 and 30 and, as shown in FIGS. 3 and 4, has an arcuate surface 44 which faces the central axis 16. The back wall's arcuate surface 44 has a radius of curvature 46 measured from a center of curvature 48 of the back wall arcuate surface. When viewed or measured in the plane 50 oriented perpendicular to the central axis 16 of the coupling 10, the center of curvature 35 of the arcuate surfaces 32 on projections 28 and 30 are non-coincident with the center of curvature 48 of the arcuate surface 44 of the back wall 40. In the example shown in FIG. 3, the centers of curvature 35 are closer to the arcuate surface of the back wall 40 than the center of curvature 48 of the back wall's arcuate surface 44 when measured to a point 52 on the back wall's arcuate surface 48 that is collinear with the centers of curvature 35 and 48, as shown by line segment 54. As further shown in FIG. 3, the centers of curvature 35 and 48 and point 52 on the back wall arcuate surface 44 are collinear along line 54, which is oriented perpendicular to a second line 55 extending between the ends 56 and 58 of the segments 12 and 14 (only segment 12 being shown).

Figure 1:
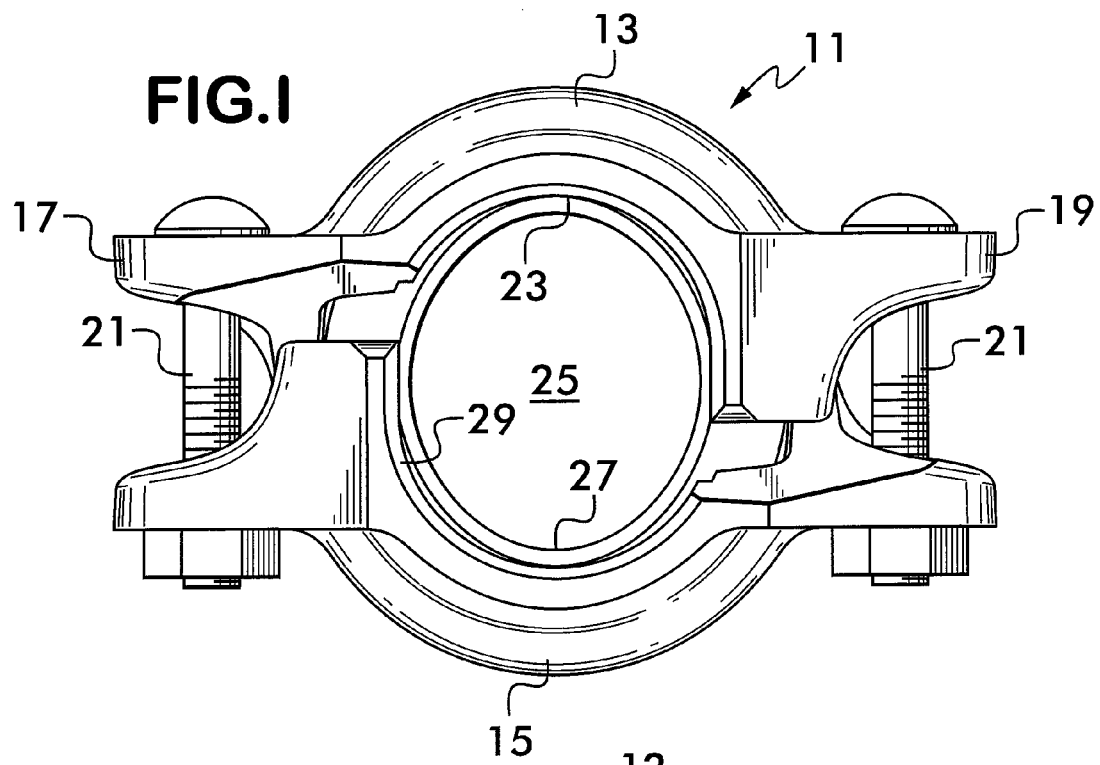
FIG. 1 is an elevational view of an example mechanical pipe coupling.

The offset distance 60 between the center of curvature 35 and the center of curvature 48 results in an eccentrically shaped gasket pocket 42 of varying depth wherein the arcuate surface 44 of the back wall extends further outwardly from a true circle as one proceeds along the back wall from the middle of the segment 12 to either end 56 or 58. If the depth 62 of the pocket 42, measured from the projection's arcuate surface 32 to the back wall's arcuate surface 44, is the value "h" at the middle of the segment, then the depth 62a at either end 56, 58 of the segment 12 is approximately "h" (62)+offset distance 60. The depth 62 may be defined as the distance between the arcuate surface 32 of the projection 30 and the arcuate surface 44 of the back wall 40, measured along a radially projecting line extending from the central axis 16. In this example embodiment, this distance, depth 62, varies from a value of h at a point between the ends 56 and 58 of the segment 12, and a greater value, h+offset, at points at each end of the segment. This increased depth, located at the ends of the segments, provides more outwardly radial room for the gasket at the ends of the segments, which, due to the geometry of the gasket 43 and the gasket pocket 42, would normally contact the gasket and distort it out of round as shown in FIG. 1. However, because the gasket pocket 42 is eccentric, with its eccentricity of h+ offset distance a maximum at the ends 56 and 58 of the segments 12 and 14 (and a minimum of "h" midway between the ends), contact between arcuate surface 44 of the back wall 40 and the outer surface 64 of the ring gasket 43 can be controlled and thereby control the degree of distortion of the ring gasket out of round when the coupling 10 is factory assembled with the segments 12 and 14 supported in spaced relation on the outer surface 64 of the ring gasket 43 so that pipe elements may be inserted into the central space 18 without disassembling the coupling. It is possible to support segment 12 and 14 in spaced relation because the circumference of the outer surface 64 of an undeformed ring gasket 43 is greater than the sum of the circumferences of the arcuate surfaces 44 on the segments 12 and 14 with which the ring gasket outer surface 64 interfaces. The degree of distortion of ring gasket 43 may range from substantially no distortion, providing the round shape shown in FIG. 2, to an oval shape as shown for ring gasket 23 in FIG. 1. As the offset distance 60 increases, the degree of ovality of the ring gasket decreases. While it is possible to eliminate substantially all of the distortion of the ring gasket, for practical designs it is sometimes advantageous to provide a controlled degree of distortion. Advantage is obtained when the degree of distortion is such that pinching of the ring gasket is avoided while maintaining enough eccentricity such that the ring gasket grips one of the pipe ends and holds it on the pipe element when it is inserted into the central space. This allows convenient assembly of the pipe joint as the technician does not need to hold the coupling and first pipe element together while he maneuvers the second pipe element into engagement with the coupling. Offset distances 60 of about 0.01 inches to about 0.1 inches are found practical for couplings suited for pipe elements having a nominal outer diameter of ten inches or less. The offset distance may further range from about 0.02 inches to about 0.04 inches, with an offset distance of about 0.03 inches being advantageous for some combinations of couplings and pipe elements.

Additional examples of notches 31 in projections 28 and 30 are shown to good effect in FIGS. 2A and 3A. Notches such as 31 provide additional clearance between the pipe elements and the coupling segments 12 and 14 thereby permitting insertion of the pipe elements into a pre-assembled coupling 10 while allowing the segments to be closer together in the preassembled, installation ready state. The notches allow shorter fasteners to be used for a more compact and practical coupling assembly. A notch 31 may have a length from about 5% to about 30% of the total length of the arcuate surfaces 32 and is advantageously positioned at one or both ends of the projections 28 and 30 adjacent to the connection members 20 and 22. When used with couplings 10 having gasket pockets of varying depth, notches 31 are effective when used with both rigid (FIG. 2) and flexible type couplings (FIG. 3). The features differentiating rigid and flexible couplings are described in detail below.

FIGS. 5, 5A, 6 and 6A illustrate respective segments 66 and 68 wherein the distance 62 between the arcuate surface 32 of the projection 30 and the arcuate surface 44 of back wall 40, as measured along a radially projecting line 70 extending from the central axis 16 is smaller at a point 72 midway between the ends 56 and 58 of the segments 66 and 68 than at a point 74 proximate to one of the ends.

Figure 5:
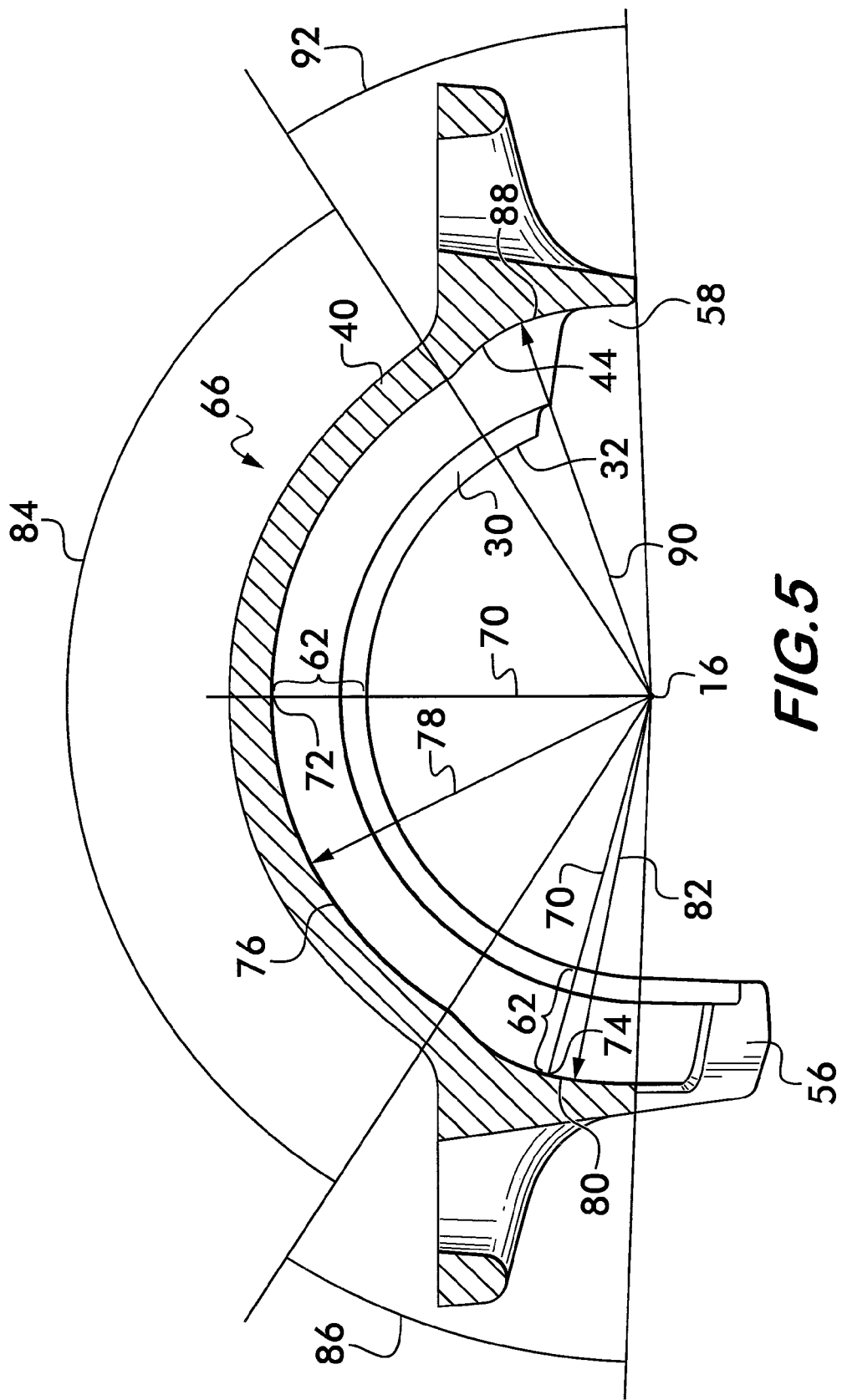
FIGS. 5 and 5A are a cross sectional views of segments of example mechanical pipe couplings according to the invention.

For segment 66, shown in FIG. 5, the arcuate surface 44 of the back wall 40 comprises a first surface portion 76 which has a first radius of curvature 78, and a second surface portion 80, positioned proximate to end 56 of segment 66, which has a second radius of curvature 82. Any point on the second surface portion 80 is farther from the central axis 16 than any point on the first portion 78. Thus the distance 62 between the arcuate surface 32 of the projection 30 and the arcuate surface 44 of back wall 40 is smaller over the angle 84 subtended by the first surface portion 76 than over the angle 86 subtended by the second surface portion 80. Second surface portion 80 may subtend an angle 86 from about 5° to about 80°. A subtended angle from about 5° to about 45° is also practical.

In this example the arcuate surface 44 further comprises a third surface portion 88 located at the opposite end 58 of the segment 66. Third surface portion 88 has a radius of curvature 90. (The respective radii of curvature 82 and 90 of the second surface portion 80 and the third surface portion 88 may be equal to one another.) Any point on the third surface portion 88 is farther from the central axis 16 than any point on the first portion 78. Thus the distance 62 between the arcuate surface 32 of the projection 30 and the arcuate surface 44 of back wall 40 is smaller over the angle 84 subtended by the first surface portion 76 than over the angle 92 subtended by the third surface portion 88. Third surface portion 88 may subtend an angle 92 from about 5° to about 80°. A subtended angle from about 5° to about 45° is also practical.

Figure 5A:
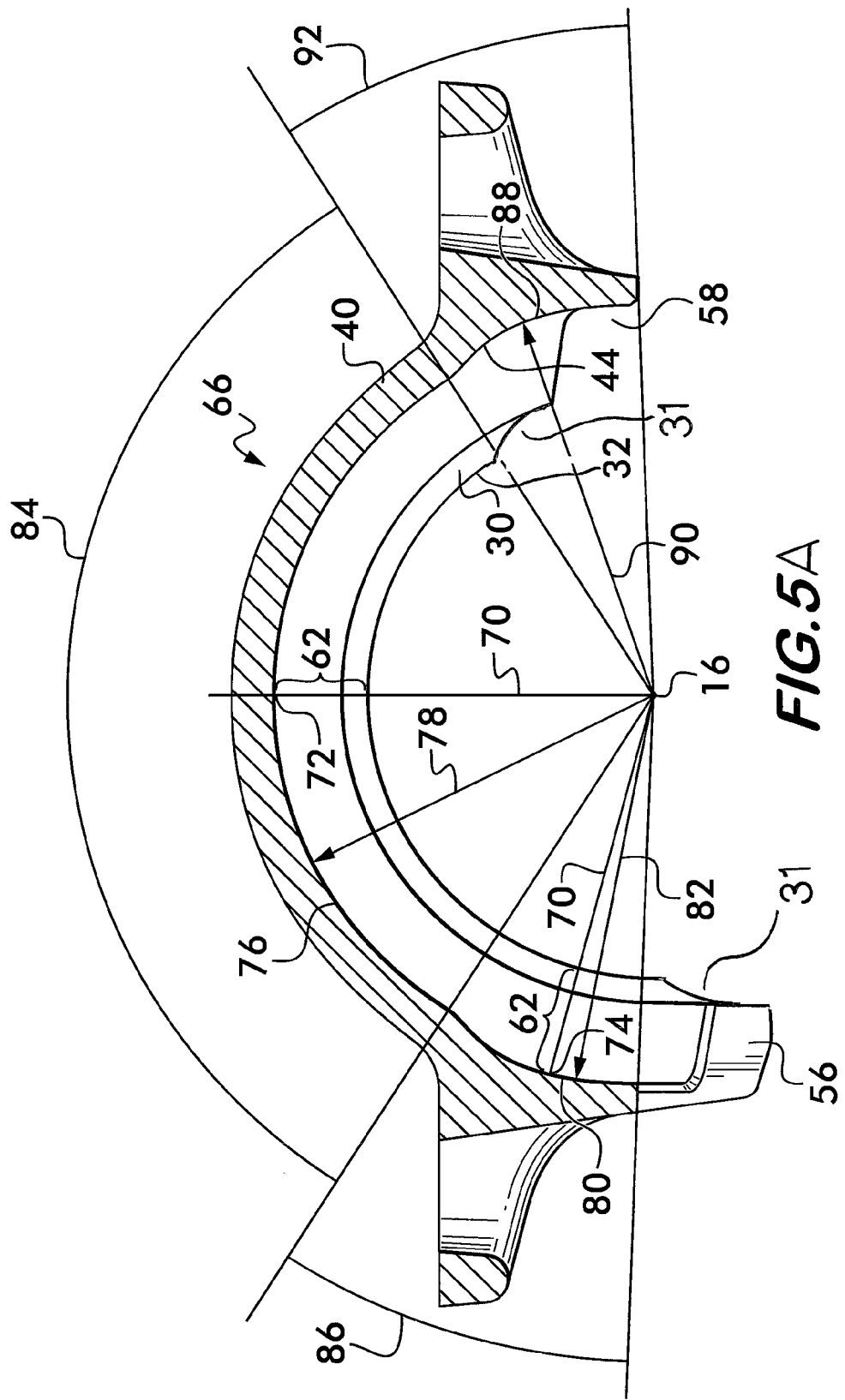

Note that the distances 62 and differences between the radii of curvature are exaggerated for clarity. While the geometrical relationships between the arcuate surfaces 32 and 44 are described for one projection 30 on one segment 66, it is understood that each segment comprising a coupling may have two such projections on opposite sides of the segment, as shown in FIG. 4, and that the geometrical relation between the arcuate surfaces on both projections and the arcuate surface of the back wall may be the same. As shown in FIG. 5A, notches 31, as described above, may also be used with segments 66 to facilitate insertion of pipe elements into the coupling assembly when in the preassembled state by providing clearance between the pipe elements and the ends of the segments. The notches also provide a more compact and practical coupling assembly as previously observed.

Figure 6:
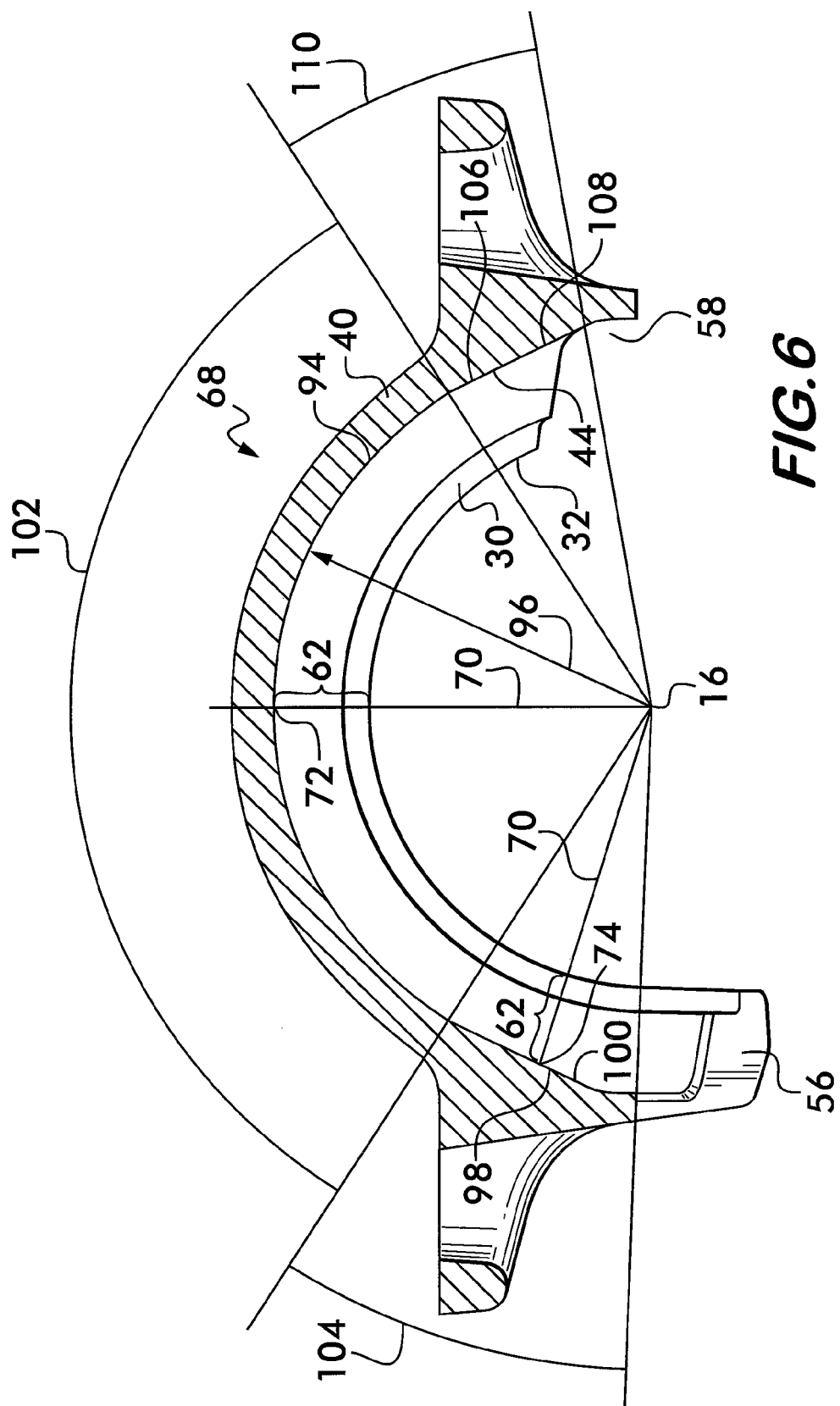

For segment 68, shown in FIG. 6, the arcuate surface 44 of the back wall 40 comprises a first surface portion 94 which has a first radius of curvature 96, and a second surface portion 98, positioned proximate to end 56 of segment 66. The second surface portion 98 has an infinite radius of curvature, meaning that the second surface portion is a flat facet 100. The facet 100 is arranged such that the distance 62 between the arcuate surface 32 of the projection 30 and the arcuate surface 44 of back wall 40 is smaller over the angle 102 subtended by the first surface portion 94 than over the angle 104 subtended by the second surface portion 98, that being the facet 100. Second surface portion 98 may subtend an angle 104 from about 5° to about 45°. A subtended angle from about 5° to about 30° is also practical.

Figure 7:
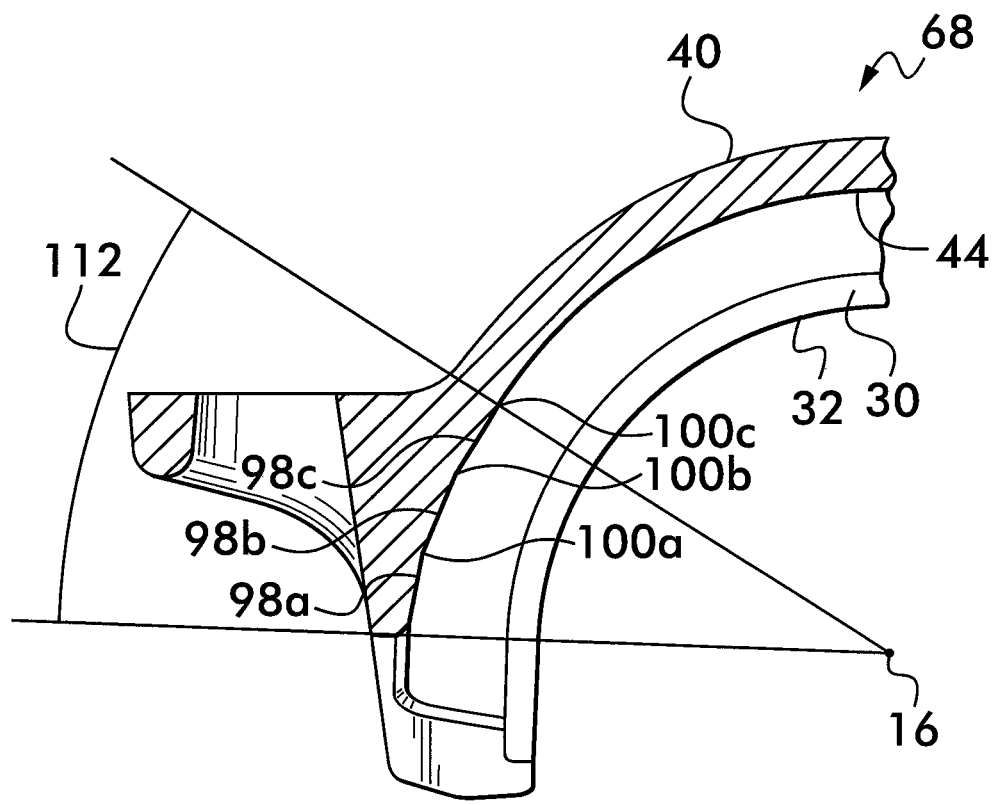
FIG. 7 shows a partial cross sectional view of an example segment on an enlarged scale.

In this example the arcuate surface 44 further comprises a third surface portion 106 located at the opposite end 58 of the segment 68. In this example the third surface portion 106 also has an infinite radius of curvature, thereby forming a facet 108. The facet 108 is arranged such that the distance 62 between the arcuate surface 32 of the projection 30 and the arcuate surface 44 of back wall 40 is smaller over the angle 102 subtended by the first surface portion 94 than over the angle 110 subtended by the third surface portion 106. Third surface portion 88 may subtend an angle 110 from about 5° to about 45°. A subtended angle from about 5° to about 30° is also practical. While the second and third surface portions 98 and 106 of the segment 68 are each shown as formed of single facets 100 and 108, it is advantageous to form a plurality of facets proximate each end of the segment 68. An example of this multifaceted structure is shown on an enlarged scale in FIG. 7, wherein the surface 44 of segment 68 is comprised of a plurality of second surface portions 98a, 98b, 98c, each having an infinite radius of curvature and forming respective facets 100a, 100b, 100c. The plurality of surface portions 98a, 98b, 98c may subtend an angle 112 from about 5° to about 80°. A subtended angle from about 5° to about 30° is also practical.

Note that the distances 62 are exaggerated for clarity. While the geometrical relationships between the arcuate surfaces 32 and 44 are described for one projection 30 on one segment 68, it is understood that each segment comprising a coupling may have two such projections on opposite sides of the segment, as shown in FIG. 4, and that the geometrical relation between the arcuate surfaces on both projections and the arcuate surface of the back wall may be the same. As shown in FIG. 6A, notches 31, as described above, may also be used with segments 68 to facilitate insertion of pipe elements into the coupling assembly when in the preassembled state by providing clearance between the pipe elements and the ends of the segments. The notches also provide a more compact and practical coupling assembly as previously observed.

The gasket pocket of varying depth, which allows the degree of distortion of the ring gasket to be controlled, provides several advantages over prior art coupling segments having pockets where the depth is a constant. When the coupling is factory assembled the gasket may have a controlled shape between oval and round. Choosing a configuration wherein the ring gasket has less distortion means that when a pipe element is inserted into the central space it will engage the pipe stop within the gasket more uniformly, thereby promoting proper seating of the pipe elements in the coupling. Furthermore, for a ring gasket with less distortion there is less likelihood of pinching the gasket between the ends of the coupling segments. However, inducing some reasonable degree of distortion to the shape of the ring gasket allows it to grip and hold onto the pipe element during assembly, which is advantageous for the technician.

The gasket pocket of varying depth described above and claimed herein is applicable to both rigid and flexible couplings. Rigid couplings are advantageously used with circumferentially grooved pipe elements. The segments of rigid couplings have interfacing surfaces which have opposite angular orientations with respect to one another. When the fasteners joining such segments together are tightened, the interfacing surfaces on one segment contact their counterpart surfaces on the mating segment and the segments are forced to rotate about a vertical axis in opposite directions relatively to one another. This causes the projections to engage the sidewalls of the circumferential groove in the pipe elements and lock them in place so as to provide significant resistance to external bending forces and torque applied to the joint, thereby limiting the relative deflections of the pipe elements. Examples of rigid couplings are shown herein in FIGS. 1, 2, and 6. Rigid couplings are disclosed in U.S. Pat. Nos. 4,611,839 and 4,639,020, both patents being hereby incorporated by reference.

In a flexible coupling the interfacing surfaces between the segments are not angled and when they engage one another they do not cause any relative rotation of the segments. Thus the projections do not engage the sidewalls of the circumferential groove due to twisting action of the segments which results in a more flexible joint, where the relative deflections of the pipe elements in bending, torsionally and axially, are greater than for the rigid joint (described above) for the same applied loads. FIG. 3 shows an example flexible coupling.

The gasket pocket of varying depth described above and claimed herein is also applicable to adapter couplings which permit pipe elements of different nominal sizes to be coupled in end to end relation. In adapter couplings each segment has projections of different radii of curvature matched to fit and engage a different size pipe element. Examples of adapter couplings used to couple grooved pipe elements are disclosed in U.S. Pat. Nos. 3,680,894 and 4,896,902, both patents being hereby incorporated by reference herein.

Pipe couplings according to the invention permit non-deforming couplings to be used as installation ready couplings and require less energy to install because there is no significant energy expended to deform the couplings when effecting the pipe joint. This corresponds to lower fatigue when manually forming joints with hand tools as well as fewer battery changes when cordless electric power tools are used.

What is claimed is:

1. A coupling for joining pipe elements in end to end relation, said coupling comprising:

first and second segments joined end to end surrounding a central axis and defining a central space for receiving said pipe elements, each one of said segments defining an eccentrically shaped gasket pocket, each one of said segments comprising:

first and second projections, each positioned in spaced apart relation on opposite sides of said segments and extending toward said central axis, at least a portion of each of said projections being engageable with a respective one of said pipe elements, each of said projections having first and second notches therein positioned respectively at opposite ends thereof, each of said projections having an arcuate surface facing said central axis;

a back wall extending between said first and second projections and eccentric to said projections as manifest by said back wall having an arcuate surface facing said central axis, a distance between said arcuate surface of said back wall and said arcuate surfaces of said projections, as measured along a radially projecting line extending from said central axis, being a first value at a point midway between said ends of said segments, said distance between said arcuate surface of said back wall and said arcuate surface of said at least one projection being a second value at a point proximate to one end of each of said segments, and said distance between said arcuate surface of said back wall and said arcuate surface of said at least one projection being a third value at a point proximate to an opposite end of each of said segments, said first value being less than said second value and said third value; and a ring gasket positioned within said central space, said ring gasket having an outer circumference having a length greater than the sum of the lengths of said arcuate surfaces of said back walls of said first and second segments, said ring gasket supporting said first and second segments in spaced apart relation, said eccentrically shaped gasket pocket controlling a degree of distortion of said ring gasket out of round.

2. The coupling according to claim 1, wherein said distance is a minimum at said first point midway between said ends of each one of said segments.

3. The coupling according to claim 2, wherein said distance is a maximum at said second point, said second point being positioned at said at least one end of each one of said segments.

4. The coupling according to claim 3, wherein said third value is approximately equal to said second value.

5. The coupling according to claim 1, comprising only a first and a second of said segments joined end to end surrounding said central axis.

6. The coupling according to claim 5, wherein said ring gasket has an oval shape.

7. The coupling according to claim 5, wherein said ring gasket has a round shape.

8. A coupling for joining pipe elements in end to end relation, said coupling comprising:

first and second segments joined end to end surrounding a central axis and defining a central space for receiving said pipe elements, each one of said segments defining an eccentrically shaped gasket pocket, each one of said segments comprising:

first and second projections, each positioned in spaced apart relation on opposite sides of said segment and extending toward said central axis, at least a portion of each of said projections being engageable with a respective one of said pipe elements, each of said projections having first and second notches therein respectively positioned at opposite ends thereof, each said projection having an arcuate surface facing said central axis, each said arcuate surface having a first radius of curvature measured from a first center of curvature;

a back wall extending between said first and second projections and eccentric to said projections as manifest by said back wall having an arcuate surface facing said central axis, said arcuate surface of said back wall having a second radius of curvature measured from a second center of curvature, said second center of curvature being non-coincident with said first centers of curvature as measured in a plane perpendicular to said central axis, such that a distance between said arcuate surface of said back wall and said arcuate surface of said projections, as measured along a radially projecting line extending from said central axis, being a first value at a first point midway between said opposite ends of said segments, said distance between said arcuate surface of said back wall and said arcuate surface of said projections being a second value at a second point proximate to one of said ends of each of said segments, and said distance between said arcuate surface of said back wall and said arcuate surface of said projections being a third value at a third point proximate to another of said ends of each of said segments, said first values being less than said second values and said third values.

9. The coupling according to claim 8, wherein, for each of said projections on each of said segments as measured in said plane, said first center of curvature is closer to said arcuate surface of said back wall than said second center of curvature when measured to a point on said arcuate surface of said back wall that is collinear with said first and second centers of curvature.

10. The coupling according to claim 9, wherein, for said first segment and for each of said projections thereon, said first and second centers of curvature and said point on said back wall are collinear along a first line oriented perpendicular to a second line extending between a first end of said first segment and a second end of said first segment.

11. The coupling according to claim 10, wherein, for said second segment and for each of said projections thereon, said first and second centers of curvature and said point on said back wall are collinear along a first line oriented perpendicular to a second line extending between a first end of said second segment and a second end of said second segment.

12. The coupling according to claim 11, wherein, for each of said projections on each of said segments, said second center of curvature is offset from said first center of curvature at a distance from about 0.01 inches to about 0.1 inches.

13. The coupling according to claim 11, wherein, for each of said projections on each of said segments, said second center of curvature is offset from said first center of curvature at a distance of about 0.02 inches to about 0.04 inches.

14. The coupling according to claim 11, wherein, for each of said projections on each of said segments, said second center of curvature is offset from said first center of curvature at a distance of about 0.03 inches.

15. The coupling according to claim 11, further comprising a ring gasket positioned between said first and second segments, said ring gasket supporting said first and second segments in spaced apart relation sufficient to insert said pipe elements between said segments, said eccentrically shaped gasket pocket controlling a degree of distortion of said ring gasket out of round.

16. The coupling according to claim 15, wherein said ring gasket has an oval shape.

17. The coupling according to claim 15, wherein said ring gasket has a round shape.

18. A coupling for joining pipe elements in end to end relation, said coupling comprising:
a plurality of segments joined end to end surrounding a central axis and defining a central space for receiving said pipe elements, at least one of said segments defining an eccentrically shaped gasket pocket, said at least one segment comprising:
a pair of projections positioned in spaced apart relation on opposite sides of said one segment and extending toward said central axis, at least a portion of each of said projections being engageable with a respective one of said pipe elements, each of said projections having an arcuate surface facing said central axis, each of said projections having first and second notches therein respectively positioned at opposite ends thereof, said arcuate surface having a first radius of curvature measured from a first center of curvature;
a back wall extending between said projections and eccentric to said projections as manifest by said back wall having an arcuate surface facing said central axis, said arcuate surface of said back wall having a second radius of curvature measured from a second center of curvature, said second center of curvature being non-coincident with said first center of curvature as measured in a plane perpendicular to said central axis, such that a distance between said arcuate surface of said back wall and said arcuate surface of at least one of said projections, as measured along a radially projecting line extending from said central axis, being a first value at a first point midway between said opposite ends of said at least one segment, said distance between said arcuate surface of said back wall and said arcuate surface of said at least one projection being a second value at a second point proximate to at least one of said ends of said at least one segment, and said distance between said arcuate surface of said back wall and said arcuate surface of said at least one projection being a third value at a third point proximate to at least another one of said ends of said at least one segment, said first value being less than said second value and said third value.

19. The coupling according to claim 18, wherein said first center of curvature is closer to said arcuate surface of said back wall than said second center of curvature when measured to a point on said arcuate surface of said back wall that is collinear with said first and second centers of curvature.

20. The coupling according to claim 19, wherein said first and second centers of curvature and said point on said back wall are collinear along a first line oriented perpendicular to a second line extending between a first end of said one segment and a second end of said one segment.

21. The coupling according to claim 20, wherein said second center of curvature is offset from said first center of curvature at a distance from about 0.01 inches to about 0.1 inches.

22. The coupling according to claim 20, wherein said second center of curvature is offset from said first center of curvature at a distance of about 0.02 inches to about 0.04 inches.

23. The coupling according to claim 20, wherein said second center of curvature is offset from said first center of curvature at a distance of about 0.03 inches.

24. The coupling according to claim 20, comprising only a first and a second of said segments joined end to end surrounding said central axis, said coupling further comprising a ring gasket positioned between said first and second segments, said ring gasket having an outer circumference having a length greater than the sum of the lengths of said arcuate surfaces of said back walls of said first and second segments, said ring gasket supporting said first and second segments in spaced apart relation, said eccentrically shaped gasket pocket controlling a degree of distortion of said ring gasket out of round.

25. The coupling according to claim 24, wherein said ring gasket has an oval shape.

26. The coupling according to claim 24, wherein said ring gasket has a round shape.

27. A coupling for joining pipe elements in end to end relation, said coupling comprising:
   a plurality of segments joined end to end surrounding a central axis and defining a central space for receiving said pipe elements, at least one of said segments defining an eccentrically shaped gasket pocket, said at least one segment comprising:
   a pair of projections positioned in spaced apart relation on opposite sides of said one segment and extending toward said central axis, at least a portion of each of said projections being engageable with a respective one of said pipe elements, at least one of said projections having an arcuate surface facing said central axis, said at least one projection having at least one notch therein positioned at an end thereof;
   a back wall extending between said projections and eccentric to said at least one projection as manifest by said back wall having an arcuate surface facing said central axis, a distance between said arcuate surface of said back wall and said arcuate surface of said at least one projection, as measured along a radially projecting line extending from said central axis, being a first value at a first point midway between said ends of said at least one segment, said distance between said arcuate surface of said back wall and said arcuate surface of said at least one projection being a second value at a second point proximate to at least one of said ends of said at least one segment, and said distance between said arcuate surface of said back wall and said arcuate surface of said at least one projection being a third value at a third point proximate to at least another one of said ends of said at least one segment, said first value being less than said second value and said third value; and
   a ring gasket positioned within said central space, said ring gasket having an outer circumference having a length greater than the sum of the lengths of said arcuate surfaces of said back walls of said segments, said ring gasket supporting at least two of said segments in spaced apart relation, said eccentrically shaped gasket pocket controlling a degree of distortion of said ring gasket out of round.

28. The coupling according to claim 27, wherein said distance is a minimum at said first point midway between said ends of said at least one segment.

29. The coupling according to claim 28, wherein said distance is a maximum at said second point, said second point being positioned at said at least one end of said at least one segment.

30. The coupling according to claim 29, wherein said third value is approximately equal to said second value.

31. The coupling according to claim 27, comprising only a first and a second of said segments joined end to end surrounding said central axis.

32. The coupling according to claim 31, wherein said ring gasket has an oval shape.

33. The coupling according to claim 31, wherein said ring gasket has a round shape.

34. The coupling according to claim 27, wherein:
   said arcuate surface of said at least one projection having a first radius of curvature measured from a first center of curvature;
   said arcuate surface of said back wall having a second radius of curvature measured from a second center of curvature, said second center of curvature being non-coincident with said first center of curvature as measured in a plane perpendicular to said central axis.

35. The coupling according to claim 34, wherein said first center of curvature is closer to said arcuate surface of said back wall than said second center of curvature when measured to a point on said arcuate surface of said back wall that is collinear with said first and second centers of curvature.

36. The coupling according to claim 35, wherein said first and second centers of curvature and said point on said back wall are collinear along a first line oriented perpendicular to a second line extending between a first end of said one segment and a second end of said one segment.

37. The coupling according to claim 36, wherein said second center of curvature is offset from said first center of curvature at a distance from about 0.01 inches to about 0.1 inches.

38. The coupling according to claim 36, wherein said second center of curvature is offset from said first center of curvature at a distance of about 0.02 inches to about 0.04 inches.

39. The coupling according to claim 36, wherein said second center of curvature is offset from said first center of curvature at a distance of about 0.03 inches.

40. The coupling according to claim 36, comprising only a first and a second of said segments joined end to end surrounding said central axis.

41. The coupling according to claim 40, wherein said ring gasket has an oval shape.

42. The coupling according to claim 40, wherein said ring gasket has a round shape.

* * * * *